(12) United States Patent
Wei

(10) Patent No.: US 12,216,643 B2
(45) Date of Patent: Feb. 4, 2025

(54) LIST UPDATE METHOD AND APPARATUS, READABLE MEDIUM, AND ELECTRONIC DEVICE

(71) Applicant: BEIJING BYTEDANCE NETWORK TECHNOLOGY CO., LTD., Beijing (CN)

(72) Inventor: Li Wei, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 89 days.

(21) Appl. No.: 17/773,592

(22) PCT Filed: Aug. 19, 2020

(86) PCT No.: PCT/CN2020/110040
§ 371 (c)(1),
(2) Date: Apr. 29, 2022

(87) PCT Pub. No.: WO2021/082649
PCT Pub. Date: May 6, 2021

(65) Prior Publication Data
US 2022/0374419 A1    Nov. 24, 2022

(30) Foreign Application Priority Data
Oct. 29, 2019   (CN) .......................... 201911040155.7

(51) Int. Cl.
*G06F 16/00*        (2019.01)
*G06F 16/23*        (2019.01)

(52) U.S. Cl.
CPC ................... *G06F 16/2379* (2019.01)

(58) Field of Classification Search
None
See application file for complete search history.

(56) References Cited

U.S. PATENT DOCUMENTS 10,735,573 B2 *  8/2020  Endo ................. H04M 1/27457
11,593,444 B2 *  2/2023  Fishman ............ H04N 21/4667
(Continued)

FOREIGN PATENT DOCUMENTS

CN    105323594 A  *  2/2016  ........... H04N 21/235
CN    106021338 A  * 10/2016  ......... G06F 16/9574
(Continued)

OTHER PUBLICATIONS

Form linkage configuration method and system, and A list updating method and system, Le et al., CN (Year: 2018).*
(Continued)

*Primary Examiner* — Jean M Corrielus
(74) *Attorney, Agent, or Firm* — BakerHostetler

(57) ABSTRACT

A list updating method and a list updating apparatus are provided. The method includes: receiving a list updating request sent from a client, where the list updating request includes list updating data for updating a list determining a target list corresponding to the list updating request according to the list updating data and a list configuration file, where the list configuration file includes configuration information of all configured lists; and updating the target list according to the list updating data.

11 Claims, 6 Drawing Sheets

Receive a list updating request sent from a client, where the list updating request includes list updating data for updating a list — 101

Determine a target list corresponding to the list updating request according to the list updating data and a list configuration file, where the list configuration file includes configuration information of all configured lists — 102

Update the target list according to the list updating data — 103

(56) References Cited

U.S. PATENT DOCUMENTS

| | | | | |
|---|---|---|---|---|
| 11,641,500 | B2* | 5/2023 | Chandra | H04N 21/8456 725/9 |
| 2004/0040021 | A1* | 2/2004 | Bharati | G06F 11/0748 714/E11.026 |
| 2007/0055671 | A1* | 3/2007 | Bangel | G06F 16/252 |
| 2010/0274839 | A1* | 10/2010 | Chiu | G06F 40/42 709/203 |
| 2012/0060195 | A1* | 3/2012 | Fishman | H04N 21/44204 725/116 |
| 2016/0366258 | A1* | 12/2016 | Endo | H04M 1/27457 |
| 2017/0046407 | A1* | 2/2017 | Palmert | G06Q 10/063114 |
| 2018/0035161 | A1 | 2/2018 | Fishman et al. | |
| 2019/0009790 | A1* | 1/2019 | Michalakis | G06F 11/3013 |
| 2020/0077292 | A1* | 3/2020 | Tsuyunashi | H04W 4/44 |

FOREIGN PATENT DOCUMENTS

| | | | | | |
|---|---|---|---|---|---|
| CN | 106294691 | A | * | 1/2017 | G06F 16/951 |
| CN | 107249140 | A | * | 10/2017 | H04N 21/26291 |
| CN | 107864172 | A | * | 3/2018 | |
| CN | 108228810 | A | * | 6/2018 | G06F 16/23 |
| CN | 108495195 | A | | 9/2018 | |
| CN | 108536706 | A | | 9/2018 | |
| CN | 105335472 | B | * | 3/2019 | G06F 16/17 |
| CN | 109948008 | A | | 6/2019 | |
| CN | 110096637 | A | | 8/2019 | |
| CN | 110334104 | A | | 10/2019 | |
| CN | 107249140 | B | * | 12/2019 | H04N 21/26291 |
| CN | 110688388 | A | * | 1/2020 | |
| CN | 110795446 | A | | 2/2020 | |
| CN | 110401843 | B | * | 2/2022 | G06F 16/2358 |
| JP | 2013105289 | A | * | 5/2013 | G06F 17/30091 |

OTHER PUBLICATIONS

CN-105335472-B (Year: 2019).*
CN-107864172-A (Year: 2018).*
International Patent Application No. PCT/CN2020/110040; Int'l Written Opinion and Search Report; dated Nov. 25, 2020; 7 pages.

* cited by examiner

LIST UPDATE METHOD AND APPARATUS, READABLE MEDIUM, AND ELECTRONIC DEVICE

CROSS REFERENCE OF RELATED APPLICATION

The present application is the national phase application of PCT International Patent Application No. PCT/CN2020/110040, filed on Aug. 19, 2020, which claims the priority to Chinese Patent Application No. 201911040155.7, titled "LIST UPDATE METHOD AND APPARATUS, READABLE MEDIUM AND ELECTRONIC DEVICE", filed on Oct. 29, 2019, with the Chinese Patent Office, both of which are incorporated herein by reference in their entireties.

FIELD

The present disclosure relates to the field of networks, and in particular to a list updating method and apparatus, a readable medium and an electronic device.

BACKGROUND

With development of the internet, a list service in which service data is recorded and ranked for certain services and the ranked service data is displayed to a user is provided in multiple application scenes. The list includes a rewarding list, a popularity list and an on-line number list in the live broadcast, or a player score ranking list, a consuming list and a state list in the on-line game.

The list is widely applied, and a same type of list may be repeatedly used according to different service scenes. For example, an hour list is used for recording certain data in one hour and ranking the data in a specific rule; and a period list is used for recording data in a time period and ranking the data in a specific rule. The time period may range from a certain time instant of a certain day to a certain time instant of another day. A starting time instant and an ending time instant of the time period may be set in configuring the list. The above lists are not developed for only one certain service scene, and may be repeatedly used in other service scenes. Presently, most of the lists are developed in a decentralized manner. When a list having the same type as that of the existing list is required to be used in a new service scene, the developed list cannot be directly used. When a new list is required to be added in a certain service scene, the list needs to be developed, resulting in time consuming increasing, redundancy and disorder of developing codes, and thus being difficult to be managed and maintained. In addition, the lists developed in the decentralized manner are required to be updated by different services, resulting in that one updating operation of a client may trigger multiple services to update the list, and thus resulting in waste of the system resource.

SUMMARY

This section is provided to introduce the concept briefly, and the concept is described in detail in specific embodiments hereinafter. This section is neither intended to identity key features or necessary features of the claimed technical solutions, nor intended to limit scope of the claimed technical solutions.

In a first aspect, a list updating method is provided according to the present disclosure. The method is applied to a server, and the method includes:

receiving a list updating request sent from a client, where the list updating request includes list updating data for updating a list;

determining a target list corresponding to the list updating request according to the list updating data and a list configuration file, where the list configuration file includes configuration information of all configured lists; and updating the target list according to the list updating data.

In a second aspect, a list updating apparatus is provided according to the present disclosure. The apparatus is applied to a server. The apparatus includes a receiving module, a first determining module and an updating module. The receiving module is configured to receive a list updating request sent from a client, where the list updating request includes list updating data for updating a list. The first determining module is configured to determine a target list corresponding to the list updating list according to the list updating data and a list configuration file, where the list configuration file includes configuration information of all configured lists. The updating module is configured to update the target list according to the list updating data.

In a third aspect, a computer readable medium storing computer programs is provided according to the present disclosure. The programs are executed by a processor to perform the method described in the first aspect.

In a fourth aspect, an electronic device is provided according to the present disclosure. The electronic device includes: a memory storing computer programs; and a processor configured to perform the computer programs stored in the memory, to perform the method described in the first aspect.

According to the above technical solution, after the list updating request sent from the client is received, one or more target lists to be updated corresponding to the list updating request are determined according to the list updating data included in the list updating request and the list configuration file including configuration information of all configured lists, and the target list is updated according to the list updating data included in the list updating request, thereby greatly reducing time consuming of list updating of a list system and thus greatly reducing complexity of developing the list. With the above technical solution, all configured lists in the list system can be managed and maintained in a unified manner according to the list configuration file. In addition, all list updating requests triggered by operations of the clients are processed in a unified manner, so that a case that one list updating request triggers multiple services to update a list corresponding to the list updating request can be avoided, thereby further saving the system resource.

Other features and advantages of the present disclosure are described in detail in specific embodiments hereinafter.

BRIEF DESCRIPTION OF THE DRAWINGS

With reference to the drawings and specific embodiments below, the above and other features, advantages and aspects of the present disclosure become more apparent. Throughout the drawings, the same or similar reference numerals indicate the same or similar elements. It should be understood that the drawings are schematic, and components and elements are unnecessarily drawn in scale.

DETAILED DESCRIPTION

Embodiments of the present disclosure are described in detail hereinafter with reference to the drawings. Although the drawings show some embodiments of the present disclosure, it should be understood that the present disclosure may be implemented by various embodiments and are not limited to be implemented by the embodiments clarified herein. The embodiments described in the present disclosure are intended to illustrate the present disclosure thoroughly and completely. It should be understood that the drawings and the embodiments are only schematic, and are not intended to limit the protection scope of the present disclosure.

It should be understood that, steps described in the embodiments of the present disclosure may be performed in different orders and/or performed in parallel. In addition, the method embodiments may include additional steps and/or steps omitted. The scope of the present disclosure is not limited thereto.

Term "including" and variations thereof adopted herein is inclusive, that is "including but not limited to". The term "based on" means "at least partially based on". The term "one embodiment" means "at least one embodiment", and the term "another embodiment" means "at least another embodiment". The term "some embodiments" means "at least some embodiments". Definitions of other terms are provided below.

It should be noted that, the terms "first" "second" and so on mentioned in the present disclosure are only used to distinguish different apparatuses, modules or units, rather than limit an order of functions performed by the apparatus, module or unit or limit interdependence.

It should be noted that, the terms "one" and "multiple" mentioned in the present disclosure are schematic rather than restrictive, and should be understood as "one or more" by those skilled in the art, otherwise explicitly illustrated in the context.

Names of messages or information interacted between multiple apparatuses in the embodiments of the present disclosure are illustrative rather than limit the scope of the message or information.

Figure 1:
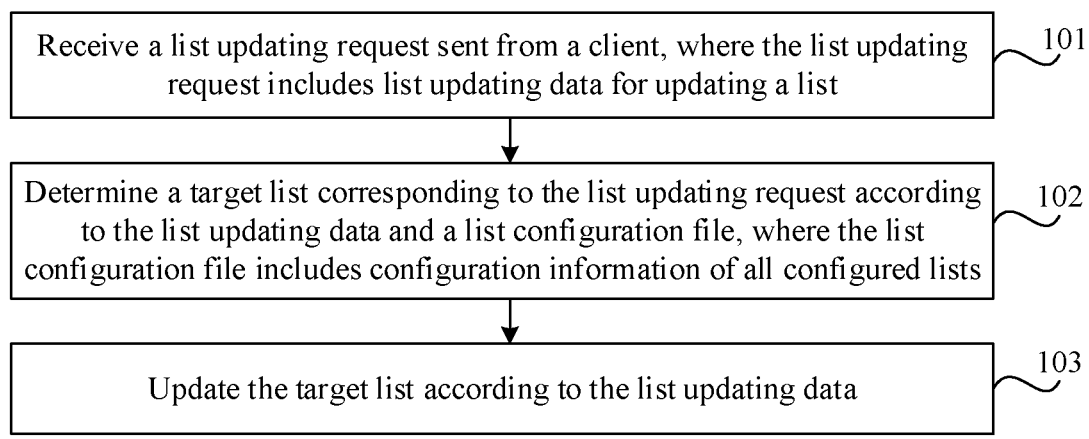
FIG. 1 is a flowchart of a list updating method according to a schematic embodiment of the present disclosure.

FIG. 1 is a flowchart of a list updating method according to a schematic embodiment of the present disclosure. The method is applied to a server. As shown in FIG. 1, the method includes steps 101 to 103.

In step 101, a list updating request sent from a client is received. The list updating request includes list updating data for updating a list.

The list updating request from the client may be triggered by any preset operation performed by a user. For example, in a live broadcast scene, the user may trigger a list updating request when sharing a live broadcasting room, so as to update a list displaying the number of times of sharing all live broadcast rooms. In an embodiment, a list updating request may be triggered when the user sends a gift to an anchor of the live broadcast room, to update a daily list, a weekly list and a total list of gifts of the anchor in the live broadcast room, and a daily list, a weekly list and a total list regarding consumption of the user, and so on.

The updating data included in the list update request is related to an actual operation of the user triggering the list updating request.

In step 102, a target list corresponding to the list updating request is determined according to the list updating data and the list configuration file. The list configuration file includes configuration information of all configured lists. After the list updating request is received, all target lists to be updated corresponding to the list updating request can be determined according to the list configuration file.

The file configuration file may be stored in a server or may be pulled from other terminal by the server. The list configuration file includes configuration information of configured lists in all service scenes. Therefore, after the list updating request is received, the list configuration file is traversed directly according to the list updating data included in the list updating request, thereby determining all target lists to be updated. The number of target list may be one or more.

For example, in the live broadcasting scene, in a case that the list updating request is triggered by sharing a broadcast room of a user by a client of the user, the list updating data included in the list updating request may include: list updating request trigger information, client user information, anchor information of the live broadcast room shared by the user, and so on. After receiving the list updating request, the server traverses configuration information of all configured lists in the list configuration file according to the list updating data included in the list updating request, to determine a target list to be updated in response to the list update request. The target list may be a list displaying the number of times of sharing the live broadcast room for each user in the live broadcast room, or may be a list displaying the number of times of sharing all the live broadcast rooms, and so on.

In step 103, the target list is updated according to the list updating data. The list configuration file is traversed, to determine the target list to be updated in response to the list updating request. Then, the target list is updated according to the list updating data included in the list update request.

In a case that there are multiple target lists, the process of updating the target list according to the list updating data includes: updating the multiple target lists one by one in an order; or simultaneously updating all the target lists or a part of the multiple target lists. The updating manner is not limited in the present disclosure.

According to the above technical solution, after the list updating request sent from the client is received, one or more target lists to be updated corresponding to the list updating request are determined according to the list updating data included in the list updating request and the list configuration file including configuration information of all configured lists, and the target list is updated according to the list updating data included in the list updating request, thereby greatly reducing time consuming of list updating of a list system and thus greatly reducing complexity of developing the list. With the above technical solution, all configured lists in the list system can be managed and maintained in a unified manner according to the list configuration file. In addition, all list updating requests triggered by operations of the clients are processed in a unified manner, so that a case that one list updating request triggers multiple services to update a list corresponding to the list updating request can be avoided, thereby further saving the system resource.

Figure 2:
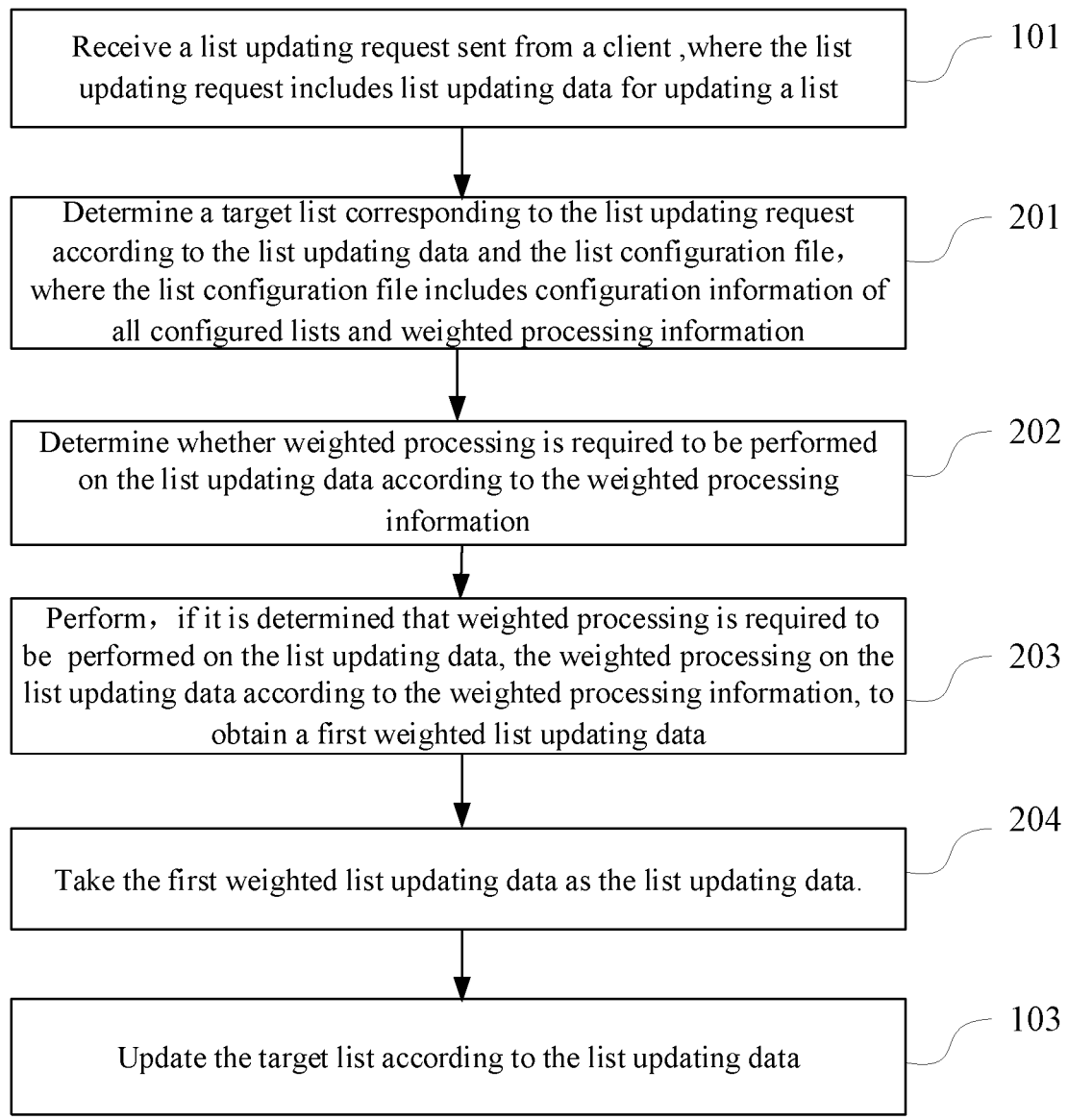
FIG. 2 is a flowchart of a list updating method according to another schematic embodiment of the present disclosure.

FIG. 2 is a flowchart of a list updating method according to another schematic example of the present disclosure. As shown in step 201 of FIG. 2, the list configuration file includes weighted processing information. The method further includes steps 202 to 204.

In step 202, it is determined whether weighted processing is performed on the list updating data according to the weighted processing information. For example, in the live broadcast scene, if the list updating request is triggered by sending a gift to an anchor or other user in the live broadcast room by the client user, the list updating data included in the received list updating request may include: list updating request trigger information, client user information, the number and money amount of gift sent by the user, and so on. The weighted processing information may include processing information for reducing a weight on the money amount of the gift. That is, the money amount of the gift sent by the user is updated according to a reduced weight in updating any list. Therefore, after the list updating request is received, it can be determined whether weighted processing is required to be performed on the list updating data according to the list updating data and the weighted processing information included in the list updating request. The process of determining whether weighted processing is required to be performed on the list updating data according to the weighted processing information may be performed before step 201. That is, an order of determining the target list and determining whether to perform weighted processing is not limited in the present disclosure.

In step 203, in a case that it is determined that weighted processing is required to be performed on the list updating data, the weighted processing is performed on the list updating data according to the weighted processing information, to obtain a first weighted list updating data. When it is determined that the weighted processing is required, the weighted processing is performed on the list updating data according to the weighed processing information. The weighted processing may include: increasing a weight of the list updating data or reducing a weight of the list updating data.

In step 204, the first weighted list updating data is taken as the list updating data.

By taking the list updating data of the first weighted list as original list updating data, step 103 is performed. That is, the target list is updated according to the first weighted list updating data.

Figure 3:
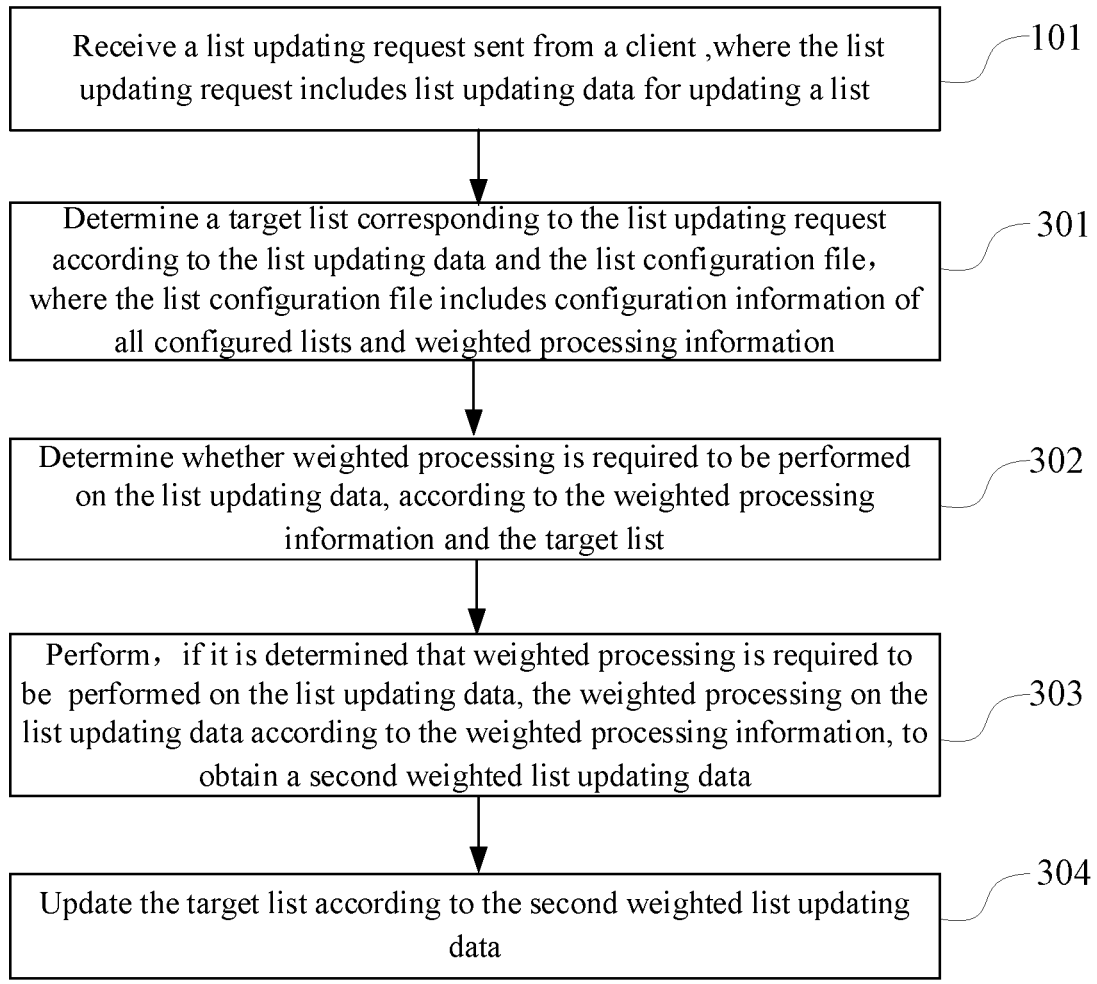
FIG. 3 is a flowchart of a list updating method according to another schematic embodiment of the present disclosure.

FIG. 3 is a flowchart of a list updating method according to another schematic embodiment of the present disclosure. As shown by step 301 of FIG. 3, the list configuration file includes weighted processing information. The method further includes steps 302 to 304.

In step 302, it is determined whether weighted processing is required to be performed on the list updating data in updating the target list, according to the weighted processing information and the target list. For example, the weighted processing information may include weighted processing information for each list. For example, in a case that it is determined that a target list A and a target list B are required to be updated according to the received list updating request, it is determined whether the target list A and the target list B are lists in which weighted processing is required to be performed on the list updating data before updating, according to the weighted processing information.

In a case that the method includes steps 201 to 204 in FIG. 2 and steps 301 to 304 in FIG. 3, step 302 may be performed after step 202 shown in FIG. 2. That is, in step 202 shown in FIG. 2, it is determined whether weighted processing is required to be performed on the list updating data. After the determination in step 202 and before updating the target list, it is determined whether the list updating data is to be updated before updating the target list according to the weighted processing information.

In step 303, in a case that it is determined that the weighted processing is required to be performed on the list updating data in updating the target list, the weighted processing is performed on the list updating data according to the weighted processing information, to obtain a second weighted list updating data a second weighted list updating data.

In step 304, the target list is updated according to the second weighted list updating data.

In a case that there are multiple target lists, whether weighting being performed on each target list is determined according to the weighted processing information. Before updating each target list for which weighted processing is to be performed on the list updating data, the weighted processing is performed on the list updating data according to the weighted processing information, and then the target list is updated according to the second weighted list updating data. Steps 302 to 304 may be performed on each target list. For example, if the target list includes the target list A and the target list B, it is determined whether weighted processing is required to be performed on the list updating data for the target list A before updating the list according to the weighted processing information. If the determination is positive, steps 303 and 304 are performed. That is, the target list A is updated according to the second weighted list updating data. If the determination for the target list B is negative, step 103 shown in FIG. 1 is directly performed. It the determination for the target list B is positive, steps 303 and 304 are performed. That is, the target list B is updated by taking the second weighted list updating data obtained by performing weighting according to the weighted processing information as the list updating data.

Weights for the target list A and the target list B may be the same, for example being reduced to 0.9; or may be different. In a case that the weights for the target list A and the target list B are same, and updating data of the second weighted list corresponding to the weight of 0.9 is obtained by performing weighted processing on the list updating data in a process of updating the target list A, the target list B may be updated by directly using the second weighted list updating data.

Figure 4:
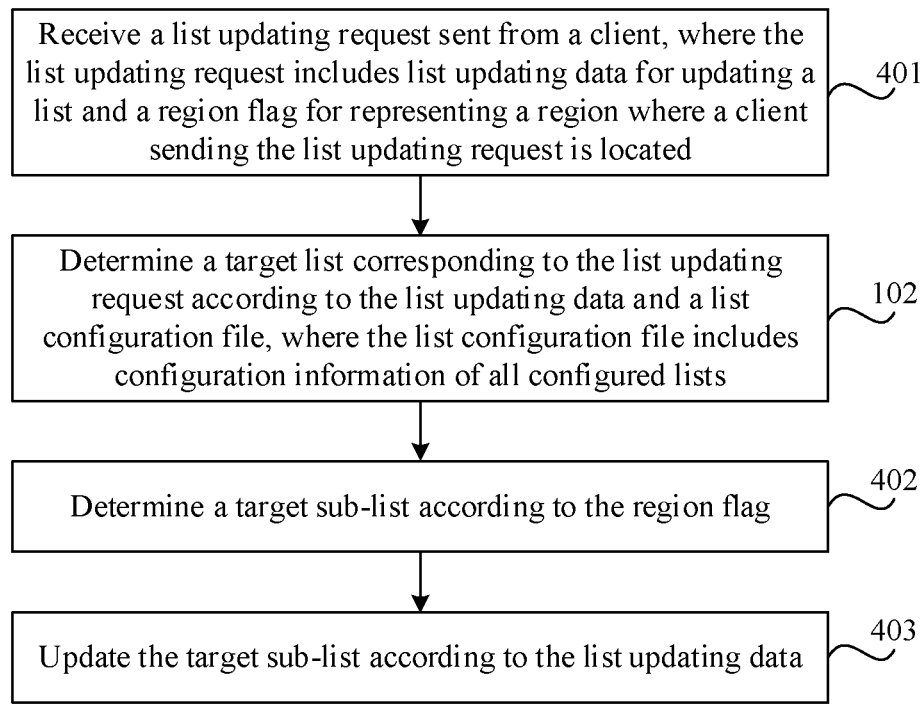
FIG. 4 is a flowchart of a list updating method according to another schematic embodiment of the present disclosure.

FIG. 4 is a flowchart of a list updating method according to another schematic embodiment of the present disclosure. As shown in FIG. 4, in step 401, a list updating request sent from a client is received. The list updating request includes not only updating data for updating a list, but also a region flag for representing a region where the client sending the list updating request is located. The method further includes steps 402 and 403.

In step 402, a target sub-list of the target list is determined according to the region flag.

In step 403, the target sub-list is updated according to the list updating data.

The region flag may be a field for representing different countries or regions. For example, China corresponds to CN field, England corresponds to EN field. The region flag may indicate China region, other region in Asia except China, America region and so on. The region flag corresponds to regions of the list data. The list data in a same region can be counted together, and the list data in different regions are counted separately. The region may be a single country or area, or may be multiple countries and/or regions, which is not limited in the present disclosure. The region flag is included in the list updating request. When receiving the list updating request, the server determines a region corresponding to the list updating request according to the region flag, and thus filters the target list according to the region.

For example, in a live broadcast scene, if a list updating request is triggered when a live broadcast client user of China shares a live broadcast room of the user, the list updating request includes a region flag representing a region where the client of the user is located, that is, CN field. After receiving the list updating request, the server determines a target list according to the list updating data in the list updating request. The target list determined currently may include a list displaying the numbers of times of sharing all the live broadcast rooms. The list displaying the numbers of times of sharing all the live broadcast rooms is not general between clients in different regions. That is, content of the live broadcast room of the Chinese live broadcast client and the list displaying the numbers of times of sharing the live broadcast room differ from content of the live broadcast room of live broadcast clients in other regions and the list displaying the numbers of times of sharing the live broadcast room. Therefore, when the target list is determined, the server can determine a region corresponding to the list updating request according to the region flag included in the list updating request, and select a target sub-list corresponding to the region flag from the target list according to the region flag, that is, the list displaying the numbers of times of sharing the live broadcast room by a live broadcast client corresponding to the China region; and thus updates the target sub-list according to the list updating data included in the list updating request.

According to the above technical solution, the lists implementing the same function and having different data source regions can be managed in a unified manner by setting the region flag, thereby simplifying development, management and maintenance of the list system, and thus saving the system resource.

In a possible implementation, the list data in the list is stored in different buckets, thereby avoiding the problem of low processing efficiency of the list due to an excessive data amount of the list, and thus greatly improving a real-time reaction speed of the list.

Figure 5:
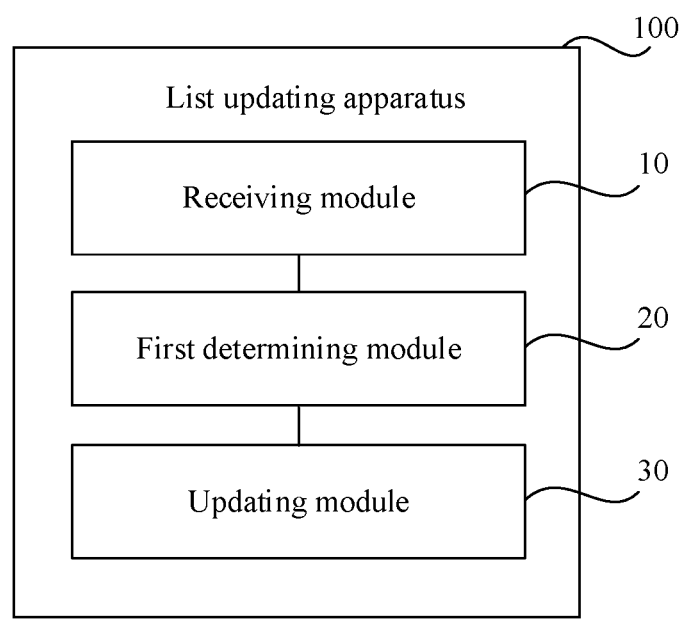
FIG. 5 is a structural block diagram of a list updating apparatus according to a schematic embodiment of the present disclosure.

FIG. 5 shows a list updating apparatus 100 according to a schematic embodiment of the present disclosure. The apparatus is applied to a server. The apparatus 100 includes a receiving module 10, a first determining module 20 and an updating module 30. The receiving module 10 is configured to receive a list updating request sent from a client. The list updating request includes list updating data for updating a list. The first determining module 20 is configured to determine a target list corresponding to the list updating request according to the list updating data and a list configuration file. The list configuration file includes configuration information of all configured lists. The updating module 30 is configured to update the target list according to the list updating data.

According to the above technical solution, after the list updating request sent from the client is received, one or more target lists to be updated corresponding to the list updating request are determined according to the list updating data included in the list updating request and the list configuration file including configuration information of all configured lists, and the target list is updated according to the list updating data included in the list updating request, thereby greatly reducing time consuming of list updating of a list system and thus greatly reducing complexity of developing the list. With the above technical solution, all configured lists in the list system can be managed and maintained in a unified manner according to the list configuration file. In addition, all list updating requests triggered by operations of the clients are processed in a unified manner, so that a case that one list updating request triggers multiple services to update a list corresponding to the list updating request can be avoided, thereby further saving the system resource.

Figure 6:
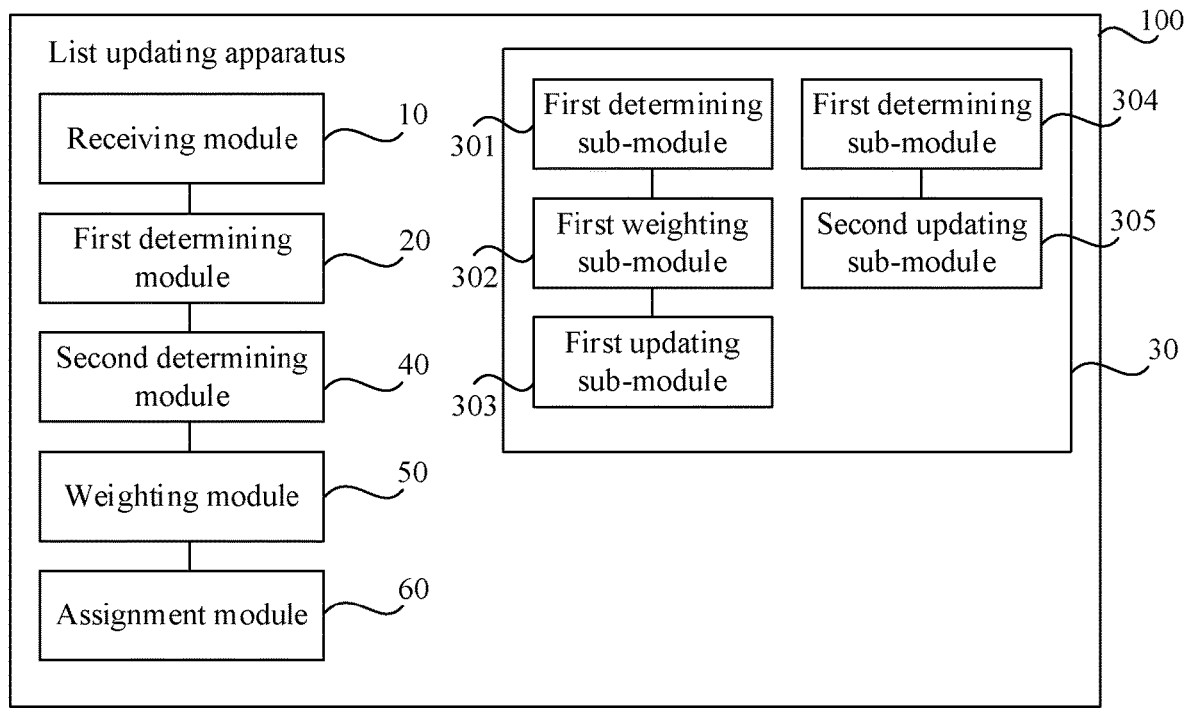
FIG. 6 is a structural block diagram of a list updating apparatus according to another schematic embodiment of the present disclosure.

FIG. 6 shows a list updating apparatus 100 according to another schematic embodiment of the present disclosure. The list configuration file includes weighted processing information. Before the updating module 30 updates the target list according to the list updating data, the apparatus 100 further includes a second determining module 40, a weighting module 50 and an assignment module 60. The second determining module 40 is configured to determine whether weighted processing is required to be performed on the list updating data according to the weighted processing information. The weighting module 50 is configured to perform, if it is determined that the weighted processing is required to be processed on the list updating data, weighting processing on the list updating data according to the weighted processing information, to obtain a first weighted list updating data. The assignment module 60 is configured to take the first weighted list updating data as the list updating data.

In a possible embodiment, as shown in FIG. 6, the list configuration list includes weighted processing information. The updating module 30 includes a first determining sub-module 301, a first weighting sub-module 302 and a first updating sub-module 303. The first determining sub-module 301 is configured to determine whether weighted processing is required to be performed on the list updating data in updating the target list, according to the weighted processing information and the target list. The first weighted sub-module 302 is configured to perform, if the first determining sub-module determines that the weighted processing is required to be performed on the list updating data in updating the target list, weighted processing on the list updating data according to the weighted processing information, to obtain a second weighted list updating data a second weighted list updating data. The first updating sub-module 303 is configured to update the target list according to the second weighted list updating data.

In a possible embodiment, as shown in FIG. 6, the list updating data includes a region flag. The region flag represents a region where the client sending the list updating request is located. The updating module 30 includes a second determining sub-module 304 and a second updating sub-module 305. The second determining sub-module 304 is configured to determine a target sub-list of the target list according to the region flag. The second updating sub-module 305 is configured to update the target sub-list according to the list updating data.

Figure 7:
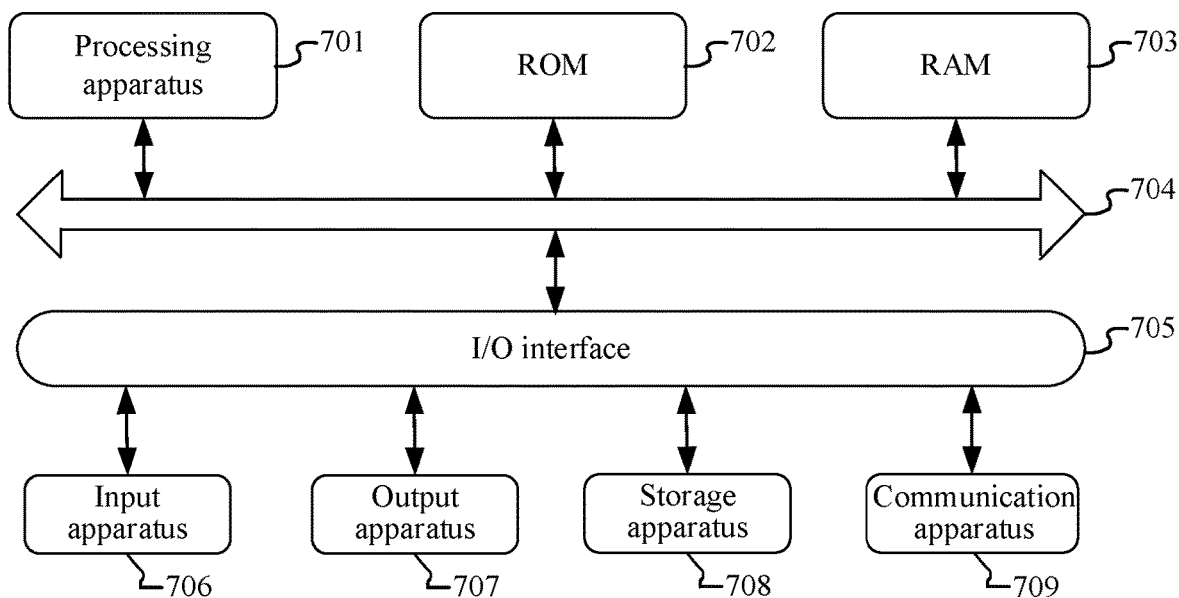
FIG. 7 is a schematic structural diagram of an electronic device according to a schematic embodiment of the present disclosure.

Reference is made to FIG. 7 which shows a schematic structural diagram of an electronic device 700 for implementing the embodiments of the present disclosure. The terminal device in the embodiments of the present disclosure may include but not limited to mobile terminals such as a mobile phone, a notebook computer, a digital broadcast receiver, a personal digital assistance (PDA), a tablet computer (PAD), a portable multi-media player (PMP) and a vehicle terminal (such as a vehicle navigation terminal); and fixed terminals such as digital TV and a desktop computer. The electronic device shown in FIG. 7 is schematic, and is not intended to limit functions and scope of the embodiments of the present disclosure.

As shown in FIG. 7, the electronic device 700 may include a processing apparatus (such as a central processor and a graphic processor) 701. The processing apparatus may perform various appropriate actions and processing by executing programs stored in a read-only memory (ROM) 702 or programs uploaded from a storage apparatus 708 to a random access memory (RAM) 703. Various programs and data required for operations of the electronic device 700 are also stored in the RAM 703. The processing apparatus 701, the ROM 702 and the RAM 703 are connected to each other through the bus 704. An input/output (I/O) interface 705 is also connected to the bus 704.

Generally, the following components are connected to the I/O interface 705: an input apparatus 706 such as a touch screen, a touch panel, a keyboard, a mouse, a camera, a microphone, an accelerometer, and gyroscope; an output apparatus 707 such as a liquid crystal display (LCD), a loudspeaker and a vibrator; a storage apparatus 708 such as a magnetic tape and a hard disk; and a communication apparatus 709. The communication apparatus 709 may allow the electronic device 700 to communicate with other device in a wired or wireless manner to exchange data. Although FIG. 7 shows the electronic device 700 provided with various apparatuses, it should be understood that not all shown apparatuses are necessary. Alternatively, more or less apparatuses may be included.

According to the embodiments of the present disclosure, a process described in the flowchart may be implemented by computer software programs. For example, according to an embodiment of the present disclosure, a computer program product including computer program carried on a non-transitory computer readable medium is provided. The computer program includes program codes for performing the method shown in the flowchart. In such embodiment, the computer program may be downloaded and installed from the network through the communication apparatus 709, installed from the storage apparatus 708 or installed from the ROM 702. The computer program is executed by the processing apparatus 701 to perform functions defined in the methods described in the embodiments of the present disclosure.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof. In the present disclosure, the computer readable storage medium may be a tangible medium including or storing programs. The programs may be used by an instruction execution system, apparatus or device, or may be used in combination with the instruction execution system, apparatus or device. In the present disclosure, a computer readable signal medium may include a data signal in a baseband or propagated as a part of carrier. The computer readable signal medium carries computer readable program codes. The propagated data signal may include but not limited to an electromagnetic signal, an optical signal or any combination thereof. The computer readable signal medium may be any computer readable medium other than the computer readable storage medium. The computer readable signal medium may send, propagate or transmit programs used by the instruction execution system, apparatus or device or the programs used in combination with the instruction execution system, apparatus or device. The program code included in the computer readable medium may be transmitted via any appropriate medium, including but not limited to an electric wire, an optical fiber, radio frequency (RF) or any appropriate combination thereof.

In some embodiments, the client and the server may perform communication by using any known network protocol such as Hyper Text Transfer Protocol (HTTP) or any network protocol to be developed, and may connect with digital data in any form or carried in any medium (for example, a communication network). The communication network includes a local area network (LAN), a wide area network (WAN), an international network (for example the internet), a peer-to-peer network (for example ad hoc peer-to-peer network), and any known network or network to be developed.

The computer readable storage medium may be included in the electronic device, or the computer readable storage medium may be independent from the electronic device, i.e., not being installed in the electronic device.

The computer readable medium carries one or more programs. When the one or more programs are executed by the electronic device, the electronic device is instructed to perform the following operations: receiving a list updating request sent from a client, where the list updating request includes list updating data for updating a list; determining a target list corresponding to the list updating request according to the list updating data and a list configuration file, where the list configuration file includes configuration information of all configured lists; and updating the target list according to the list updating data.

Computer program codes for performing operations of the present disclosure may be written by using one or more program design language or any combination. The program design language includes but not limited to object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams shown in the drawings show a system architecture, function and operation which may be implemented by the system, method and computer program product according to the embodiments of the present disclosure. Each block in the flowcharts or the block diagram may represent a part of a module, a program section or codes including executable instructions for implementing specified logic functions. It should be noted that, in alternative embodiment, functions denoted in the blocks may be performed in an order different from the order denoted in the drawing. For example, operations in two blocks connected successively may be performed in parallel, or may be performed in an opposite order, depending on the involved function. It should be noted that, each block in the block diagrams and/or flowcharts, and a combination of blocks in the block diagrams and/or flowcharts may be implemented by a dedicated hardware system for performing specified functions or operations, or may be implemented by a combination of dedicated hardware and computer instructions.

Modules involved in the embodiments of the present disclosure may be implemented by software or hardware. Names of the modules do not limit the modules in a certain case. For example, the receiving module may be described as "a module receiving a list updating request sent from a client".

The functions described above may be partially performed by one or more hardware logic components. For example, the hardware logic components include: a field programmable gate array (FPGA), an application specific integrated circuit (ASIC), an application specific standard product (ASSP), a system on chip (SOC), a complex programmable logic device (CPLD) and so on.

It the context of the present disclosure, the computer readable medium may be a tangible medium including or storing programs. The programs may be used by an instruction execution system, apparatus or device, or may be used in combination with the instruction execution system, apparatus or device. The machine readable medium may be a machine readable signal medium or a machine readable storage medium. The machine readable storage medium may include but not limited to a system, an apparatus or a device in an electric, magnetic, optical, electromagnetic, infrared or a semiconductor form, or any combination thereof. The machine readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof.

According to one or more embodiments of the present disclosure, a list updating method is provided according to a first example. The method is applied to a server. The method includes: receiving a list updating request sent from a client, where the list updating request includes list updating data for updating a list; determining a target list corresponding to the list updating request according to the list updating data and a list configuration file, where the list configuration file includes configuration information of all configured files; and updating the target list according to the list updating data.

According to one or more embodiments of the present disclosure, a list updating method similar to that in the first example is provided according to a second example. The list configuration file includes weighted processing information. Before the process of updating the target list according to the list updating data, the method further includes: determining whether weighted processing is required to be performed on the list updating data according to the weighted processing information; and performing, if it is determined that the weighted processing is required to be performed on the list updating data, the weighted processing on the list updating data according to the weighted processing information, to obtain a first weighted list updating data; and taking the first weighted list updating data as the list updating data.

According to one or more embodiments of the present disclosure, a list updating method similar to that in the first example is provided according to a third example. The list configuration file includes weighted processing information. The process of updating the target list according to the list updating data includes: determining whether weighted processing is required to be performed on the list updating data in updating the target list, according to the weighted processing information and the target list; and performing, if it is determined that the weighted processing is required to be performed on the list updating data in updating the target list, the weighted processing on the list updating data according to the weighted processing information, to obtain a second weighted list updating data a second weighted list updating data; and updating the target list according the second weighted list updating data.

According to one or more embodiments of the present disclosure, a list updating method similar to that in the first example to the third example is provided according to a fourth example. The list updating data incudes a region flag for representing a region where the client sending the list updating request is located. The process of updating the target list according to the list updating data includes: determining a target sub-list of the target list according to the region flag; and updating the target sub-list according to the list updating data.

According to one or more embodiments of the present disclosure, a list updating method similar to that in the fourth example is provided according to a fifth example. The method includes: storing list data in the list in different buckets.

According to one or more embodiments of the present disclosure, a list updating apparatus is provided according to a sixth example. The apparatus is applied to a server, and the apparatus includes a receiving module, a first determining module and an updating module. The receiving module is configured to receive a list updating request sent from a client. The list updating request includes list updating data for updating a list. The first determining module is configured to determine a target list corresponding to the list updating request according to the list updating data and a list configuration file. The list configuration file includes configuration information of all configured lists. The updating module is configured to update the target list according to the list updating data.

According to one or more embodiments of the present disclosure, a list updating apparatus similar to that in the sixth example is provided according to a seventh example. The list configuration file includes weighted processing information. Before the updating module updates the target list according to the list updating data, the apparatus further includes a second determining module, a weighting module and an assignment module. The second determining module is configured to determine whether weighted processing is required to be performed on the list updating data according to the weighted processing information. The weighting module is configured to perform, if it is determined that the weighted processing is required to be performed on the list updating data, the weighted processing on the list updating data according to the weighted processing information, to obtain a first weighted list updating data. The assignment module is configured to take the first weighted list updating data as the list updating data.

According to one or more embodiments of the present disclosure, a list updating apparatus similar to that in the sixth example is provided according to an eighth embodiment. The list configuration file includes weighted processing information. The updating module includes a first determining sub-module, a first weighting sub-module and a first updating sub-module. The first determining sub-module is configured to determine whether weighted processing is required to be performed on the list updating data in updating the target list, according to the weighted processing information and the target list. The first weighting sub-module is configured to perform, if the first determining sub-module determines that the weighted processing is required to be performed on the list updating data in updating the target list, the weighted processing on the list updating data according to the weighted processing information, to obtain a second weighted list updating data a second weighted list updating data. The first updating sub-module is configured to update the target list according to the second weighted list updating data.

According to one or more embodiments of the present disclosure, a computer readable storage medium storing computer programs is provided according to a ninth example. The computer programs are executed to perform the methods described in any of the first example to the fifth example.

According to one or more embodiments of the present disclosure, an electronic device is provided according to a tenth example. The electronic device includes a memory and a processor. The memory stores computer programs. The processor is configured to execute the computer programs stored in the memory, to perform the methods described in any of the first example to the fifth example.

The preferred embodiments and the technical principles of the present disclosure are described above. It should be understood by those skilled in the art that, the protection scope of the present disclosure is not limited to the technical solutions formed by specific combination of the above technical features, and other technical solutions formed by random combinations of the above technical features or equivalent features without departing from the concept of the present disclosure also fall within the protection scope of the present disclosure, for example the technical solution formed by replacement between the above technical features and technical features with similar functions disclosed (not limited) in the present disclosure.

Although the operations are described in a specific order, the operations are unnecessarily to be performed in the specific order or in a chronological order. In a certain environment, a multi-task and parallel processing may be beneficial. Although specific details are described above, the details should not be understood as restriction to the scope of the present disclosure. Some features described in the context of different embodiments may be combined in one embodiment. Alternatively, the features described in the context of one embodiment may be implemented in multiple embodiments independently or in any appropriate sub-combination.

The subject matter is described by language specific to the structure feature and/or method logic, it should be understood that the subject matter defined in the appended claims is not limited to the specific features or actions described above. The specific features and actions are only schematic implementation of the claims. For the apparatus embodiments, operations of the various modules have been described in detail in the related method embodiments, and details are not described herein.

What is claimed is:

1. A method for improving efficiency of updating lists by a server and saving resources of the server, applied to the server, the server configured to record and rank on-line data to provide lists of rankings in a live stream scene, the method comprising:
   receiving a list updating request sent from a client associated with a live stream room, wherein the list updating request comprises list updating data, the list updating data comprising information related to an operation of triggering the list updating request, wherein the list updating data comprise information indicative of the triggering operation in the live stream scene, information associated with the client, and information associated with an anchor of the live stream room;
   acquiring, by the server, a list configuration file, wherein the list configuration file comprises configuration information and weighting processing information of all lists that have been configured, and wherein the server manages and maintains the lists of rankings in the live stream scene based on the configuration information and the weighting processing information of the all lists in the list configuration file;
   traversing, by the server, the configuration information of the all lists in the list configuration file based on the list updating data to determine all target lists of rankings in the live stream scene to be updated;
   performing weighting processing on the list updating data for at least some of the all target lists of rankings in the live stream scene based on the weighting processing information in the list configuration file and generating weighted list updating data; and
   updating the at least some of the all target lists of rankings in the live stream scene by the server according to the weighted list updating data.

2. The method according to claim 1, wherein before updating any of the all target lists, the method further comprises:
   determining whether weighting processing is required to be performed on the list updating data according to the weighting processing information; and
   in response to determining that the weighting processing is required to be performed on the list updating data, performing weighting processing on the list updating data according to the weighting processing information to obtain a first weighted list updating data.

3. The method according to claim 1, wherein the method further comprises:
   determining whether weighting processing is required to be performed on the list updating data in updating the at least some of the all target lists, according to the weighting processing information and the all target lists;
   in response to determining that weighting processing is required to be performed on the list updating data in updating the at least some of the all target lists, performing the weighting processing on the list updating data according to the weighting processing information to obtain a second weighted list updating data; and
   updating the at least some of the all target lists according to the second weighted list updating data.

4. The method according to claim 1, wherein the list updating data comprises a region flag for representing a region where the client sending the list updating request is located; and wherein the method further comprises:
   determining a target sub-list in the all target lists according to the region flag; and
   updating the target sub-list by the server.

5. The method according to claim 4, wherein data displayed in the list is stored in different buckets.

6. A server for improving efficiency of updating lists and saving resources of the server, the server configured to record and rank on-line data to provide lists of rankings in a live stream scene, the server comprising:
   at least one processor; and
   at least one memory communicatively coupled to the at least one processor and storing instructions that upon execution by the at least one processor cause the server to perform operations comprising:
   receiving a list updating request sent from a client associated with a live stream room, wherein the list updating request comprises list updating data, the list updating data comprising information related to an operation of triggering the list updating request, wherein the list updating data comprise information indicative of the triggering operation in the live stream scene, information associated with the client, and information associated with an anchor of the live stream room;
   acquiring, by the server, a list configuration file, wherein the list configuration file comprises configuration information and weighting processing information of all lists that have been configured, and wherein the server manages and maintains the lists of rankings in the live stream scene based on the configuration information and the weighting processing information of the all lists in the list configuration file;
   traversing, by the server, the configuration information of the all lists in the list configuration file based on the list updating data to determine all target lists of rankings in the live stream scene to be updated;
   performing weighting processing on the list updating data for at least some of the all target lists of rankings in the live stream scene based on the weighting processing information in the list configuration file and generating weighted list updating data; and
   updating the at least some of the all target lists of rankings in the live stream scene by the server according to the weighted list updating data.

7. The server according to claim 6, wherein before updating any of the all target lists, the operations further comprise:
   determining whether weighting processing is required to be performed on the list updating data according to the weighting processing information; and
   in response to determining that the weighting processing is required to be performed on the list updating data, performing weighting processing on the list updating data according to the weighting processing information to obtain a first weighted list updating data.

8. The server according to claim 6, wherein the operations further comprise:
   determining whether weighting processing is required to be performed on the list updating data in updating the at least some of the all target lists according to the weighting processing information and the all target lists;
   in response to determining that weighting processing is required to be performed on the list updating data in updating the at least some of the all target lists, performing the weighting processing on the list updating data according to the weighting processing information to obtain a second weighted list updating data; and
   updating the at least some of the all target lists according to the second weighted list updating data.

9. The server of claim 6, wherein the list updating data comprises a region flag for representing a region where the client sending the list updating request is located; and wherein the operations further comprise:
   determining a target sub-list in the all target lists according to the region flag; and
   updating the target sub-list by the server.

10. The server of claim 9, wherein data displayed in the list is stored in different buckets.

11. A non-transitory computer readable medium storing computer programs, wherein the programs are executed by a server, the server is configured to record and rank on-line data to provide lists of rankings in a live stream scene, and the programs upon execution by the server cause the server to perform operations comprising:
   receiving a list updating request sent from a client associated with a live stream room, wherein the list updating request comprises list updating data, the list updating data comprising information related to an operation of triggering the list updating request, wherein the list updating data comprise information indicative of the triggering operation in the live stream scene, information associated with the client, and information associated with an anchor of the live stream room;
   acquiring, by the server, a list configuration file, wherein the list configuration file comprises configuration information and weighting processing information of all lists that have been configured, and wherein the server manages and maintains the lists of rankings in the live stream scene based on the configuration information and the weighting processing information of the all lists in the list configuration file;
   traversing, by the server, the configuration information of the all lists in the list configuration file based on the list updating data to determine all target lists of rankings in the live stream scene to be updated;
   performing weighting processing on the list updating data for at least some of the all target lists of rankings in the live stream scene based on the weighting processing information in the list configuration file and generating weighted list updating data; and
   updating the at least some of the all target lists of rankings in the live stream scene by the server according to the weighted list updating data.

* * * * *